June 13, 1972  D. W. HUGHES, JR  3,669,755
BATTERY CLOSURE DEVICE
Filed Nov. 9, 1970
FIG. 1
FIG. 2
FIG. 3
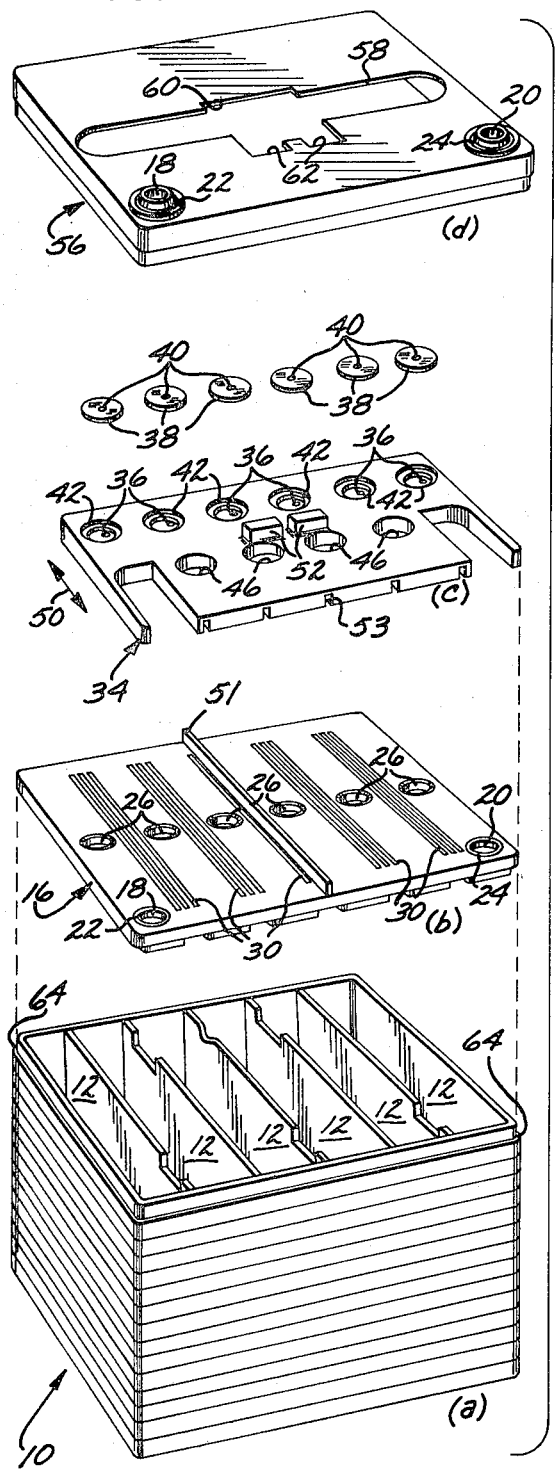
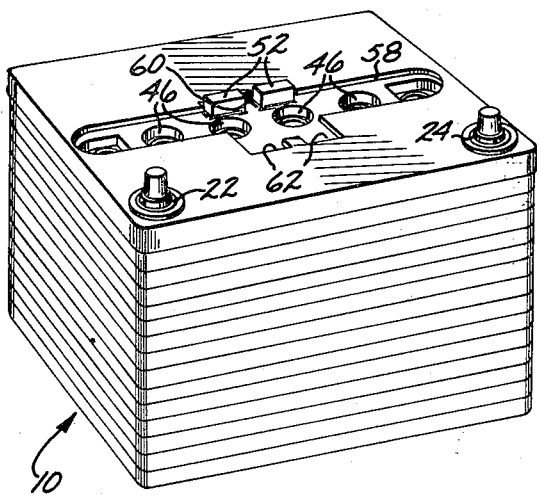
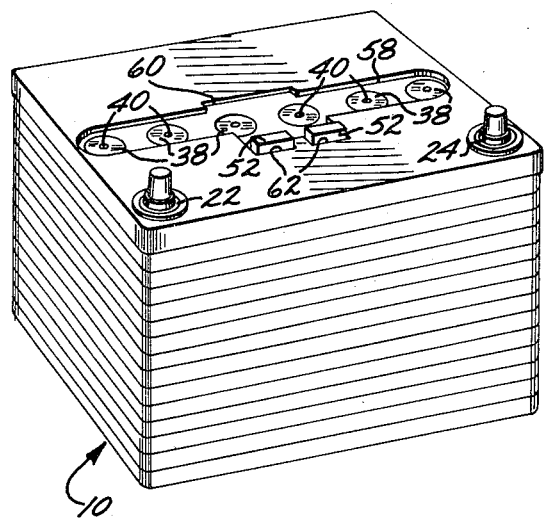
INVENTOR.
DONALD W. HUGHES JR.
BY
Nienow & Frater
ATTORNEYS

United States Patent Office

3,669,755
Patented June 13, 1972

3,669,755
BATTERY CLOSURE DEVICE
Donald W. Hughes, Jr., 3908 S. Rambla Orienta,
Malibu, Calif. 90265
Filed Nov. 9, 1970, Ser. No. 88,049
Int. Cl. H01m 1/06
U.S. Cl. 136—170            10 Claims

ABSTRACT OF THE DISCLOSURE

This invention relates to apparatus for simultaneously opening or closing all of the cell openings of a multi-cell storage battery. The closure device takes the form of a slider unit that may occupy either of two positions; one of the positions exposing all of the cell openings for servicing, and the other of said positions sealing all of the cell openings, except for venting purposes.

---

The present invention relates generally to storage battery closure devices, and more particularly to means for opening and closing all of the cells of a multi-cell battery with a single movement to thereby facilitate testing and servicing of such battery.

BACKGROUND

Storage type batteries are becoming evermore useful in many fields; i.e., automotive, marine, electronic, etc.; so that servicing them becomes an evermore important task. One of the most important of the servicing functions is that of inspecting and re-establishing the liquid level of the battery cells; and in the past this has meant the removal of the cell plugs by either unscrewing them, or in the newer batteries, by snapping them out of a frictionally held engagement. After suitable inspection and servicing, the cell plugs had to be replaced, singly in older style batteries, and in groups in the newer batteries. This time-consuming procedure, unfortunately, caused many maintenance men to bypass battery servicing, resulting in poor battery operation, premature battery failure, and over-frequent battery replacement.

It has therefore been a longtime goal of battery manufacturers to provide an improved way to examine and service batteries; and many solutions have been proposed. Most of the proposed solutions depended upon more easily replaceable cell plugs; and since in the newer batteries it was possible to space the cells with more exactitude, most of the proposed solutions used ganged cell plugs. However, it became apparent that even the ganged plug approach required appreciable service time.

OBJECTS AND DRAWINGS

It is therefore the principal object of the invention to provide an improved battery.

It is another object of the invention to provide an improved battery that requires a minimal time for inspection and servicing.

It is still another object of the invention to provide an improved battery having provisions for the simultaneous opening and closing of all the battery cells.

It is a further object of the invention to provide an improved battery having a multiple cell closure device.

It is a still further object of the invention to provide an improved battery having a more attractive appearance.

The attainment of these objects, and others, will be realized from a study of the following description, taken in conjunction with the drawings, of which FIG. 1 is an exploded view showing the component parts of the battery;

FIG. 2 is a view of the battery with the cells open for servicing; and

FIG. 3 is a view of the battery with the cells covered for protection.

SYNOPSIS

Broadly stated, the present invention relates to a battery having a closure device for quickly and easily simultaneously opening all of the cell openings for inspection and servicing, and for simultaneously closing all of the cell openings for their protection. To achieve this result, a slider unit has a set of service openings and a set of vent openings, the openings of each individual set being spaced to register with a respective cell opening. When the slider unit is in one position, its service openings are brought in alignment with the cell openings, and when the slider unit is in its other position its vent openings are brought into alignment with the cell openings.

Various battery components co-act to produce this result, and their structure, principles and modifications are discussed.

DESCRIPTION

Battery case

FIG. 1a shows battery case 10 of the standard box shape; and formed of a suitable material such as an acid-resistant plastic, hard rubber, or the like—such materials and their fabrication techniques being well-known. These same well-known materials and techniques may, of course, be used for the forming of the other battery components to be discussed later.

Storage batteries are available in a variety of voltages, and in general, each battery cell produces two volts, so that for the average twelve volt battery it is necessary to use six battery cells. In accordance, FIG. 1a indicates the use of six such battery cells 12.

It is also known that the battery has electrical posts to which the electrical circuitry of the utilization device is electrically connected, and while such posts are not indicated in FIG. 1a (having been omitted for clarity of battery illustration) the battery posts are generally positioned at the corners of the battery.

Battery top

FIG. 1b shows a battery top 16 that is basically a flat sheet of suitable material, and is shown to have two openings 18 and 20 for the battery posts to project through, and sealing rings 22 and 24 for providing a seal around the battery posts to prevent the leakage of battery fluid.

FIG. 1b also shows battery top 16 to have a plurality, six in this case, of cell openings 26 positioned above respective battery cells 12. The battery top as thus far described is quite similar to prior art battery tops, except that the prior art battery tops formed the outer portion of the battery, and its cell openings were adapted to accept the prior art cell plugs.

However, in the battery top 16 of FIG. 1b, the cell openings are plain holes and are not threaded or formed to accept a cell plug. Preferably, each cell opening 26 has a smooth top surface, although the edges of the cell openings 26 may advantageously be chamfered.

A slight digression becomes desirable at this point. It is known that many liquids tend to creep along a surface because of a phenomenon known as "capillary action," and that this liquid creepage depends upon many factors, among them being the characteristics of the liquid, the nature of the surface material, the distances involved, etc. Therefore, depending upon factors such as these, the disclosed battery top 16 may exhibit fluid creepage. In order to eliminate or minimize this creepage, a plurality of anti-capillary grooves 30 are formed into the surface of battery top 16. These grooves lengthen the surface distance between adjacent cell openings, and thus discourage fluid creepage.

The battery top 16 is suitably sized to rest on the vertical walls of battery case 10, the battery top 16 being bonded to the battery case 10 by any of the well-known techniques. In this way, a plurality of individual battery cells are formed, and these are electrically connected together in the well-known manner.

Slider unit

Attention is now directed to FIG. 1c, which shows a slider unit 34. This too comprises a flat sheet of material, and is substantially as long as the battery top previously discussed, but is only about two-thirds as wide—the reason for this to be discussed later.

Slider unit 34 is shown to have a row of lower vent openings 36 that basically are merely small holes formed through the thickness of the slider unit 34. In order to minimize outward splashing of the battery fluid through the vent openings 36, these may open into individual recesses 42 having individual caps 38 containing small upper vent openings 40. To further minimize splashing, the lower and upper vent openings 36 and 40 may be spatially displaced, and a baffle may be positioned between the displaced vent openings, the baffle taking the form of an arcuate partition that may be part of the recess.

Caps 38 are of suitable diameter to snap into recesses 42 and to be held in these recesses by the resultant frictional forces; or, alternatively to be bonded in place.

Slider unit 34 also has, along its other edge, an alignment of service openings 46 spaced apart the same distance as the cell openings 26 of the battery top 16 of FIG. 1b. Actually, six such service openings are needed, one for each cell, but FIG. 1c shows only four such service openings, the two end ones having been slotted into U-shaped configurations. The net effect, however, is to provide six service openings of substantially the same size as the cell openings of battery top 16.

As indicated by the double-ended arrow 50 of FIG. 1c, the entire slider unit 34 slides back and forth in a transverse direction across the width of battery top 16. This is the reason that the end service openings of the slider unit are slotted into a U-shape, as this shape permits the slider unit to move without interference from the battery posts.

The illustrated situation assumes that the two battery posts are on the same longitudinal edge of the battery, so that the U-shaped slots are therefore similarly oriented, but if the particular design of the battery had been such that the battery posts were positioned differently, the slots would be placed accordingly.

In order to move the slider unit 34, a handle is desirable and FIG. 1c illustrates a handle that comprises two spaced apart stubs 52. While other handle configurations, such as a one-piece handle or a depression may be used, the illustrated stub handle has an advantage that will become apparent from a later discussion.

As indicated above, and by the double-ended arrow 50 of FIG. 1c the entire slider unit 34 slides back and forth in a transverse direction across the width of battery top 16. In order to assure a smoother sliding action, it may be desirable to incorporate a guiding means between the slider unit 34 and the battery top 16; and this guiding means may readily take any of a number of forms. For example, as illustrated, in FIGS. 1b and 1c, one form of the guiding means may be a track and groove arrangement. In the illustrated case, one centrally positioned guiding track 51 is illustrated as being incorporated into the top surface of battery top 16; and a complementary guiding groove 53 is incorporated into the bottom surfaces of the slider unit 34. Alternatively, these may be reversed; that is, the guiding groove may be in the battery top, and the guiding track may be in the slider unit. Thus, the guiding track 51 and its co-acting guiding groove 53 provide a smoother non-binding sliding movement of the slider unit relative to the battery top.

It is indicated in FIG. 1b that the guiding track 51 may replace one of the anti-capillary grooves 30; but actually, the guiding track 51 acts in a similar anticapillary manner—since the track also increases the length of the battery fluid's creepage path.

For still better guidance of the sliding motion, it may be desirable to incorporate additional track/groove arrangements (indicated by the additional grooves); but these do not necessarily have to be in position to coincide with the anti-capillary grooves, being positionable anywhere to suit the needs of the battery designer.

It should be noted at this time, that it may be desirable to provide an anti-capillary arrangement on the bottom surface of the slider unit 34, either as an addition to—or as a replacement for—that shown.

Battery cover

The described slider unit 34 is placed, unaffixed, onto battery top 16 and the battery cover 56 of FIG. 1d is positioned over the entire assembly. As shown, battery cover 56 preferably takes the shape of a disposable tissue box cover, and comprises suitable battery post openings and seals 18, 20, 22, and 24. Battery cover 56 further comprises a central longitudinal slot 58 that is large enough to encompass all of the cell openings 26 of the battery top 16 shown in FIG. 1b. Slot 58 is configured to include cutouts 60, 62 for accepting the stub handles 52.

When assembled, battery cover 56 fits over the slider unit 34 and the battery top 16, and comes to rest on shoulders 64 of battery case 10 of FIG. 1a.

OPERATION

The overall operation is as follows. Once the disclosed battery components have been assembled, the slider unit 34 is able to slide transversely of the battery—sliding on battery top 16 and within battery cover 56. If desired, tracks and suitable pressure elements such as springs of resilient pads may be positioned between the slider unit and the lower surface of the battery cover. Referring now to FIG. 2, it will be seen that this illustration shows the composite battery with the slider unit moved away from the observer, this being the servicing position of the slider unit that exposes the cell openings. With the slider unit in this position, the handle 52 is being received within cut-out 60; and the service openings of the slider unit are aligned and in registry with respective cell openings. Thus, one simple movement of the handle simultaneously uncovers all of the cell openings, the service openings being large enough for a thorough examination, for the use of a tester, such as a hydrometer, for the use of a water-adding nozzle, etc.

FIG. 3, on the other hand, shows the composite battery with the slider unit moved toward the observer, this being the normal operating position of the slider unit that covers and protects the cell openings. With the slider unit in this position, the handle 52 is being received within cut-outs 62, and the vent openings of the slider unit are aligned and in registry with respective cell openings. Thus, one simple movement of the handle simultaneously covers all of the cell openings; the vent openings being small enough to minimize danger of dirt entering the battery cells, and yet being large enough to vent the cells.

It will be recognized that the slider unit is a relatively snug fit within the battery cover, but it may be desirable to further minimize leakage of the battery fluid. To achieve this result, slider unit 34 of FIG. 1c has its lower surface suitably grooved to receive individual O-rings positioned to surround each vent-opening 36. Thus, as the O-rings of the slider unit 34 slide across the chamfered cell openings 26, they form a seal interconnecting each vent opening 36 and its associated cell opening 26. Since this is the normal position of the apparatus, the described arrangement provides additional sealing against fluid leakage.

As will be realized, the handle should preferably be unitary, and centered with respect to the slider unit; but presently used battery hold-down apparatus rules against this. For example, some of the automobiles now in use have a battery hold-down rod that presses downward at the center of the battery top. In order to permit continued usage of this type of battery hold-down with the disclosed battery, the subject handle is therefore split into two sections, thus allowing the existent hold-down rod to fit across the new battery, and to perform its design function.

It has been found that the overall height and size of the disclosed battery is substantially the same as the older type that do not have the disclosed advantages.

SUMMARY

The disclosed battery structure has innumerable advantages over prior art batteries. First of all, the cell closure device is an integral part of the battery structure and can't be dirtied or lost by dropping, misplacing, or the like. Second, the time required for battery examination is reduced to seconds, and is easily performed by a simple finger movement, thus encouraging more frequent battery checks. Third, the newly disclosed battery presents a clean smart appearance. Other advantages have been mentioned.

I claim:
1. A battery structure comprising:
    (A) a battery case;
    (B) a battery top position on said battery case, said battery top having
        two openings for the posts of said battery,
        a plurality of cell openings positioned above respective cells of said battery;
    (C) a slider unit positioned to slide along said battery top, said slider unit having
        a like plurality of service openings alignable with respective said cell openings of said battery top,
        a like plurality of vent openings alignable with respective said cell openings of said battery top,
        whereby said slider unit may be moved to align either said service openings or said vent openings with said cell openings of said battery top;
    (D) a battery cover positioned on said case top combination, said cover having
        two openings for said posts of said battery,
        a slotted opening aligned with said cell openings.
2. The combination of claim 1 wherein said battery top comprises a plurality of parallel anticapillary grooves positioned in the upper surface of said battery top between adjacent said service openings
3. The combination of claim 1, wherein said plurality of vent opening are provided with recesses and have a like plurality of vent opening caps located in said vent opening recesses of said slider unit.
4. The combination of claim 1, including guiding means for guiding the sliding movement of said slider unit relative to said battery top.
5. A battery structure comprising:
    (A) a battery case adapted to receive a multiplicity of battery cells;
    (B) a battery top for said battery case, said battery top having
        (a) two openings for receiving the posts of said battery,
        (b) a plurality of centrally aligned cell openings positioned above respective cells of said battery,
        (c) a set of parallel anti-capillary grooves positioned in the upper surface of said battery top between adjacent said cell openings;
        (d) means for affixing said battery top to said battery case,
    (C) a slider unit positioned to slide transversely relative to the upper surface of said battery top to assume either of two positions relative to said battery top, said slider unit having
        (e) a like plurality of service openings positioned to be aligned with respective cell openings of said battery top when said slider unit is in a first position,
        (f) a like plurality of vent openings positioned to be aligned with respective cell openings of said battery top when said slider unit is in a second position,
        (g) the end ones of said service openings being U-shaped to accommodate said posts of said battery,
        (h) handle means for sliding said slider unit to either slider unit position to align either said service openings or said vent openings with said cell openings of said battery top,
    (D) a like plurality of vent opening caps located in recesses of said vent openings of said slider unit;
    (E) a battery cover, said cover having
        (i) two openings for said posts of said battery,
        (j) a slotted opening aligned with said cell openings of said battery top,
        (k) recessed means for receiving said slider unit handle means in either position of said slider unit,
        (l) means for affixing said battery cover to said case/top combination for enclosing said slider unit between said cover and said top.
6. The combination of claim 4 including an O-ring positioned in the lower surface of said slider unit surrounding each said vent openings—whereby a sliding seal is produced to prevent fluid leakage from said cells.
7. The combination of claim 3, including baffle means for minimizing outward splashing of battery fluid, said baffle means comprising a partition located between the vent openings of said slider unit and the openings of said vent opening caps.
8. The combination of claim 1, including guiding means for guiding the sliding movement of said slider unit relative to said battery top, said guiding means comprising at least one guiding track/guiding groove combination.
9. The combination of claim 1 wherein said guiding groove is in said slider unit.
10. The combination of claim 1 wherein said guiding track is in said slider unit.

References Cited

UNITED STATES PATENTS

| | | | |
|---|---|---|---|
| 3,218,198 | 11/1965 | Havlick | 136—170 |
| 3,560,266 | 2/1971 | Mossford | 136—177 |

WINSTON A. DOUGLAS, Primary Examiner

H. A. FEELEY, Assistant Examiner

U.S. Cl. X.R.

136—177

UNITED STATES PATENT OFFICE
CERTIFICATE OF CORRECTION

Patent No. __3,669,755__ Dated __June 13, 1972__

Inventor(s) __Donald W. Hughes, Jr.__

It is certified that error appears in the above-identified patent and that said Letters Patent are hereby corrected as shown below:

Column 5, line 28, "position" should read -- positioned --
line 47, "anticapillary" should read -- anti-capillary -- ;
at the beginning of line 30, before "two" insert -- (a) -- ;
at the beginning of line 31, before "a" insert -- (b) -- ;
at the beginning of line 35, before "a" insert -- (c) -- ;
at the beginning of line 37, before "a" insert -- (d) -- ;
at the beginning of line 39, before "whereby" insert -- (e) -- ;
at the beginning of line 44, before "two" insert -- (f) -- ;
at the beginning of line 45, before "a" insert -- (g) -- ;
line 50, "service" should read -- cell -- ; line 52, "opening" should read -- openings -- .

Signed and sealed this 20th day of March 1973.

(SEAL)
Attest:

EDWARD M. FLETCHER, JR.　　　　　　　ROBERT GOTTSCHALK
Attesting Officer　　　　　　　　　　Commissioner of Patents